June 20, 1967     G. W. ELEY     3,326,049

SOIL SAMPLING DEVICE

Filed Sept. 10, 1964

INVENTOR
Gail W. Eley

BY *Albert J. Kramer*
ATTORNEY

United States Patent Office 3,326,049
Patented June 20, 1967

3,326,049
SOIL SAMPLING DEVICE
Gail W. Eley, 124 Charles Drive,
Havertown, Pa. 19083
Filed Sept. 10, 1964, Ser. No. 395,476
8 Claims. (Cl. 73—429)

This invention relates to soil testing and it is more particularly concerned with means for determining the volume of samples of soil for various purposes.

In irrigation work, for example, it is necessary to determine the moisture content of the soil in the crop root zone at relatively frequent intervals. This information was previously obtained by physical measurements involving laboratory facilities and equipment. To convert soil moisture to inches of water, it was necessary to determine the bulk density of the soil, which is the ratio of the weight of the oven-dried soil sample to the field volume of the sample. This procedure required that undisturbed field volume samples be taken to a soils laboratory for processing, which resulted in a delay of 8 to 12 hours before the needed data could be obtained and the need for irrigation could be determined. Even such a short delay can, for special crops, result in loss of both qualify and yield. Even so, such laboratory facilities are not available to the average irrigation farmer who is compelled to irrigate by "feel" or some "rule of thumb."

In the construction of earth dams, as another example, the volume of soil samples is commonly determined by the sand cone method. This method also requires the use of laboratory equipment, such as balances and drying ovens, to determine the percentage of moisture in the soil, and is not suitable for making volume measurements of soil samples taken at various depths in the soil profile.

The general object of the invention is the provision of a tool for measuring quickly and accurately, the volume of soil samples.

Another object is the provision of such a tool which can be used in the field, which is highly reliable, and easy to use.

Still further objects are the provision of such a tool which is inexpensive to manufacture and not likely to get out of working order.

These and still further objects, advantages and features of the invention will appear more fully from the following description and the accompanying drawing.

Figure 1:
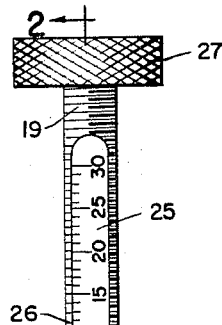
FIG. 1 is an elevational view of an embodiment of the invention.

Referring to the drawing with more particularity, the embodiment illustrated comprises a smooth, continuous and uninterrupted cylindrical body 11, preferably thin-walled, and of tempered brass or stainless steel. However, any other suitable material may be used. The diameter of the body is selected so that longitudinal volumetric increments correspond to scale graduations, hereinafter more fully described.

The outer edge of the cylindrical body 11 has a circular bevel 12 extending outwardly and rearwardly from the inner surface of the cylindrical body which provides a sharp circular edge 13 to facilitate insertion in the soil to be sampled substantially without disturbing the sample.

A depth gauge in the form of an annular flange 14 is secured to the opposite end of the body 11 by means of an annulus 15 surrounding the body 11 and secured to it by solder 16 or by any other suitable means. The interior of the body at this same end has an end wall 17 in the form of a plug inserted therein and secured in position with solder or any other suitable means. This wall plug has a central threaded bore 18 which engages a threaded shaft 19.

Figure 5:
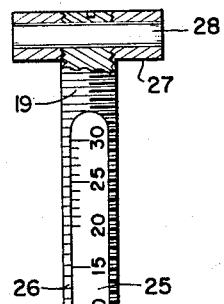
FIG. 5 is a longitudinal sectional view of the embodiment and of a section of soil into which it has been inserted for the purpose of extracting a sample.
Figure 6:
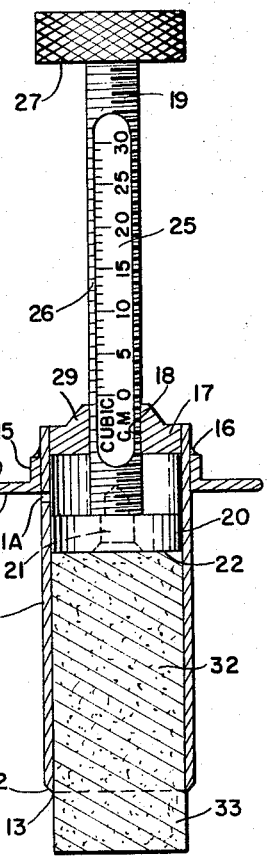
FIG. 6 is a longitudinal sectional view of the embodiment showing the extrusion of a portion of the retained sample in accordance with the method of using the device.
Figure 2:
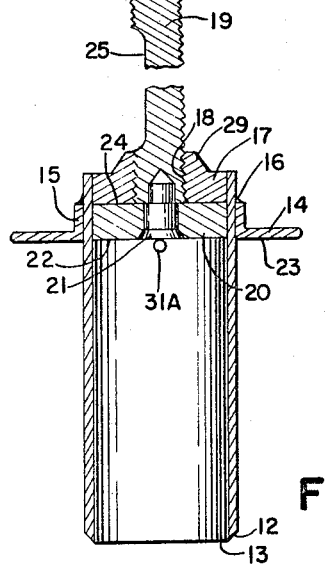
FIG. 2 is a sectional view of the embodiment, partly broken away, along the line 2—2 of FIG. 1.
Figure 3:
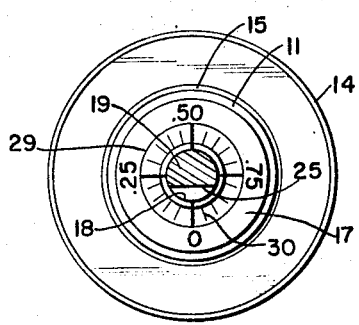
FIG. 3 is a cross-sectional view along the line 3—3 of FIG. 1.
Figure 4:
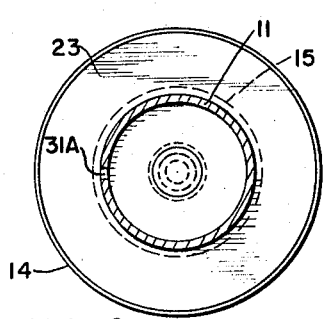
FIG. 4 is a bottom plan view of the embodiment.

The inner end of the shaft 19 is rotatably connected to a piston 20 on the inside of the body 11 by means of a countersunk connecting pin 21. In its fully retracted position, as shown in FIG. 5, the outwardly facing side 22 of the piston is in the same transverse plane as the outer face 23 of the depth gauge flange 14 and the inner side 24 abuts the end wall 17.

On one side, the shaft 19 is provided with a flat surface 25 and this flat surface is provided with graduations forming a linear scale 26 which represent the volume of soil filling the body 11 that is extruded by longitudinal movement of the piston 20.

The piston is moved by rotating the shaft 19 and a knob 27 having a knurled surface is provided at the outer end of the shaft 19 to facilitate manual turning. The knob is secured to the shaft by a transverse pin 28. The edge of the wall 17 serves as an index mark for the scale 26.

The outer surface of the end wall 17 has a portion 29 which contains graduations forming a circular scale 30 adjacent the shaft 19. This scale 30 is related to the scale 26 as a sub-division to provide finer readings. A suitable mark on the shaft 19, such as an edge of the flat surface 25, serves as an index for the scale 30.

The device is used as follows:

The shaft 19 is fully retracted to the initial position of the piston 20 against the wall 17 and the outer end of the body 11 is pushed into the soil 31 to be tested, as shown in FIG. 5, until the gauge flange 14 contacts the said body. Trapped air is vented through a side vent 31A in the body 11. It is then removed carrying with it a core sample 32 of the soil. The edge of an ordinary knife (not shown) is then passed over the outer end of the body to even the retained sample at this outer end with the end of the body.

The knob 27 is then turned to cause the piston 20 to push the sample toward the outer end of the body 11. As increments 33 of the sample are extruded beyond the edge 13, they are cut off with the knife flush with the edge 13 and placed on a conventional scale (not shown) for weighing. This may be continued until a given weight of soil is extruded, whereupon the displaced volume is read on the scales 26 and 30. The air vent 31A in this operation equalizes air pressure between the exterior and interior of the body 11.

By means of other conventional devices (not shown), the moisture content of the sample can be quickly determined.

With this information, it is possible to calculate the inches of total water in the soil profile.

These determinations can be made at selected intervals of time, for example, in a field of growing plants wherefrom it can be calculated how much water was withdrawn from the soil in a given period, and, hence, how much water is required to be added to the soil by irrigation.

The dry density of the soil can also be computed with this information which is useful in soil conservation practices.

Having thus described my invention, I claim:

1. A soil sampling device comprising a tubu'ar shell having one end open, said open end having a taper extending outwardly and rearwardly from the inner surface of the shell, the said inner surface being smooth, continuous, and uninterrupted throughout its effective length, the space within said shell being also uninterrupted, a piston slidably disposed in the shell, a rod connected to the piston in the shell, and means for indicating volumetric displacements of the piston in the shell.

2. A soil sampling device as defined by claim 1 and a wall in the rearward end of said shell, a rod connected to said piston, said wall having an aperture therethrough threadedly engaged with the rod, and said means for indicating volumetric displacements being between the rod and the end wall.

3. A soil sampling device as defined by claim 2 in which the means for indicating volumetric displacements comprises a flat longitudinal surface on one side of the rod and delineations carried by said surface forming a scale.

4. A soil sampling device as defined by claim 3 and delineations carried by the end wall about the rod forming a scale of subdivisions in relation to the scale on the rod.

5. A soil sampling device as defined by claim 1 and a depth gauge carried by the shell on the exterior thereof to limit the insertion of the shell in soil to be sampled.

6. A soil sampling device as defined by claim 5 in which the depth gauge is in the form of a circular flange and means securing the flange to the shell.

7. A soil sampling device as defined by claim 6 in which the depth gauge is disposed with its outer face in the same transverse plane as the plane of the outer face of the piston in fully retracted position.

8. A soil sampling device as defined by claim 1 in which the shell is provided with an air vent to equalize air pressures between the interior and exterior of the shell as the piston is slidably moved therethrough.

References Cited

UNITED STATES PATENTS

| 1,060,493 | 4/1913 | Reed | 73—425.2 |
| 1,109,446 | 9/1914 | Melberg | 73—425.2 |
| 1,162,901 | 12/1915 | Cantey | 73—425.2 |
| 2,565,140 | 8/1951 | Leustig | 33—170 |
| 2,885,121 | 5/1959 | Littleton | 111—7.3 |

FOREIGN PATENTS 15,827  9/1893  Great Britain.

LOUIS R. PRINCE, *Primary Examiner.*

W. A. HENRY, *Assistant Examiner.*